(12) United States Patent
Honold

(10) Patent No.: US 9,752,683 B2
(45) Date of Patent: Sep. 5, 2017

(54) SEALING DEVICE

(71) Applicant: Voith Patent GmbH, Heidenheim (DE)

(72) Inventor: Jochen Honold, Bad Wörishofen (DE)

(73) Assignee: Voith Patent GmbH, Heidenheim (DE)

( * ) Notice: Subject to any disclaimer, the term of this patent is extended or adjusted under 35 U.S.C. 154(b) by 210 days.

(21) Appl. No.: 13/965,365

(22) Filed: Aug. 13, 2013

(65) Prior Publication Data

US 2013/0328272 A1 Dec. 12, 2013

Related U.S. Application Data

(63) Continuation of application No. PCT/EP2012/051682, filed on Feb. 1, 2012.

(30) Foreign Application Priority Data

Feb. 14, 2011 (DE) .................. 10 2011 004 055

(51) Int. Cl.
*F16J 15/16* (2006.01)
*D21F 3/10* (2006.01)
*D21F 1/50* (2006.01)

(52) U.S. Cl.
CPC .............. *F16J 15/168* (2013.01); *D21F 1/50* (2013.01); *D21F 3/10* (2013.01); *F16J 15/16* (2013.01)

(58) Field of Classification Search
CPC .................. D21F 1/50; D21F 1/52; D21F 3/10
See application file for complete search history.

(56) References Cited

U.S. PATENT DOCUMENTS

| 2,290,777 | A | * | 7/1942 | Street | D21F 3/10 15/DIG. 7 |
| 4,576,682 | A | * | 3/1986 | Laapotti | D21F 3/0218 100/154 |
| 5,242,547 | A | * | 9/1993 | Corbellini et al. | 162/351 |
| 5,314,585 | A |   | 5/1994 | Ward | |
| 5,466,341 | A |   | 11/1995 | Kankaanpää | |
| 5,471,765 | A | * | 12/1995 | Rautakorpi et al. | 34/242 |
| 2003/0183355 | A1 | * | 10/2003 | Petschauer et al. | 162/217 |
| 2004/0118543 | A1 | * | 6/2004 | Hilger | 162/199 |
| 2015/0191872 | A1 | * | 7/2015 | Erkelenz | D21F 3/10 277/500 |
| 2015/0204014 | A1 | * | 7/2015 | Erkelenz | D21F 3/10 277/300 |

(Continued)

FOREIGN PATENT DOCUMENTS

WO 2007/003698 A1 1/2007

OTHER PUBLICATIONS

English Abstract of DE 10325686A1.*

(Continued)

*Primary Examiner* — Nicholas L Foster
(74) *Attorney, Agent, or Firm* — Taylor IP, P.C.

(57) ABSTRACT

A sealing device for sealing at least one underpressure or overpressure zone adjoining a surface which is moved in a movement direction in a paper, tissue or cardboard machine, includes at least one sealing element which is located opposite the moved surface and has at least one feed channel for a lubricant. In order to considerably decrease the wear of a sealing element uniformly over the entire length thereof, the at least one feed channel ends in a supply channel, which is arranged at the beginning of the sealing element in the movement direction.

9 Claims, 1 Drawing Sheet

(56) References Cited

U.S. PATENT DOCUMENTS

2015/0218753 A1* 8/2015 Erkelenz .................. D21F 3/10
  492/28
2016/0002854 A1* 1/2016 Erkelenz ................ D21F 5/143
  162/372

OTHER PUBLICATIONS

English translation of the Notification of Transmittal of Translation of the International Preliminary Report on Patentability and Written Opinion of the International Searching Authority dated Aug. 29, 2013 for International Application No. PCT/EP2012/051682 (8 pages).

Communication Via the Transmission of the International Search Report and the Written Opinion of the International Searching Authority or the Policy dated May 7, 2012 for International Application No. PCT/EP2012/051682 (10 pages).

* cited by examiner

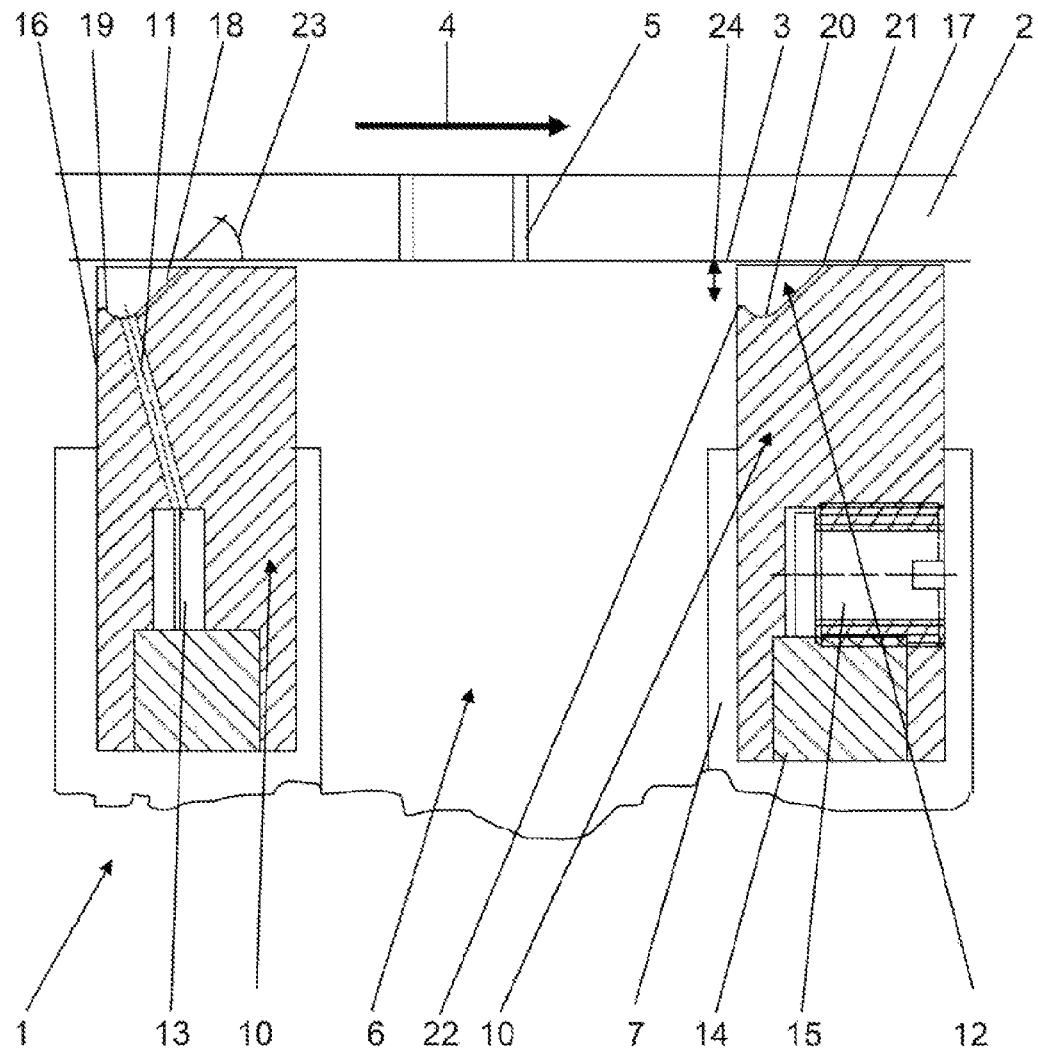

SEALING DEVICE

CROSS REFERENCE TO RELATED APPLICATIONS

This is a continuation of PCT application No. PCT/EP2012/051682, entitled "SEALING DEVICE", filed Feb. 1, 2012, which is incorporated herein by reference.

BACKGROUND OF THE INVENTION

1. Field of the Invention

The present invention relates to a sealing device for sealing at least one underpressure or overpressure zone adjoining a moving surface which is moving in a direction of travel in a paper, tissue or cardboard machine. The sealing device includes at least one sealing element which is located opposite the moving surface and has at least one feeding channel for lubricant.

2. Description of the Related Art

Sealing devices of this type are used in practice in the forming section as well as in the press section and/or the drying section of a respective paper machine application where among other possibilities they can be installed in suction rolls or blow rolls. Suction boxes are generally equipped with stationary internal suction boxes which form, for example, adjustable zones with at least one pressure level, whereby sealing of the pressure or vacuum zones occurs in a direction of travel of the paper machine fabric by means of sealing strips which generally extend across the entire roll length. The roll shell is perforated so that, for example, water from a fabric can be discharged through the holes in the shell into the suction zone and can subsequently be transported out of the roll.

To seal the vacuum on suction equipped roll types in the direction of travel of the paper machine fabric or respectively in the direction of movement of the moving surface, strip-like sealing elements (therefore also referred to as sealing strips) which have a continuous sealing surface are used which are in contact with the inside surface of the roll shell, in other words with the aforementioned moving surface. The sealing element in this case is subjected to relatively high wear and tear resulting from abrasion and temperature development, so that the sealing element in practical use must be continuously readjusted. After removal of the maximum wear layer the roll must be opened and the sealing element must be replaced.

To cool a sealing element, but also to lubricate it, it is often sprayed with a cool lubricant over its entire length, for example with spray nozzles. However, suction rolls comprise for example at least two sealing elements, whereby, viewed in direction of rotation of the shell only the first sealing strip benefits, because the lubricant is usually already completely doctored off in this location so that it is not carried to the second sealing strip. The spray nozzles are moreover susceptible to contamination.

To cool the sealing element it was suggested in DE 103 25 686 A1 to equip a sealing element with closed lines through which a cooling agent flows.

To reduce wear and tear it is known from WO 2007003698 A1 to incorporate a radial feeding channel into the sealing element to be able to supply a lubricant into the region between the interior surface of the shell and the sealing element. In a trial a retrofit of this design has shown that it leads to uneven wear of the sealing element in the cross machine (CD)-direction and is therefore not expedient.

What is needed in the art is to clearly and uniformly reduce wear of a sealing element over its entire length.

SUMMARY OF THE INVENTION

The present invention provides a sealing device including at least one feeding channel which terminates in a supply channel which—viewed in the direction of movement—is arranged at the beginning of the sealing element.

Through such a supply channel the sealing surface adjoining the moving surface can be supplied continuously and over the entire sealing element length with lubricant. This reduces friction and cools the sealing element. The supply channel is supplied through at least one feeding channel. The longer the sealing element, the more purposeful it is to incorporate several feeding channels in order to arrange filling of the supply channel as uniformly as possibly over its entire length.

It is thus even feasible for the supply channel to extend substantially over the entire length of the underpressure or overpressure zone, with the exception of possible short disruptions compared to the length of the sealing element. Here, the direction of extension is essentially to be understood to be vertical to the direction of movement. The aforementioned disruptions are hereby limited to the ends of the supply channel and to potential stabilizing webs.

The supply channel is, for example, formed by a cutout in the sealing element. Generally, the supply channel can be manufactured by just one chucking in a milling machine, thus making the production of a sealing element which is ready for use easy. The cutting head simply draws a groove into the sealing element.

It is thereby provided, firstly that the sealing element according to the present invention includes one sealing surface which faces the moving surface, and one side surface, and secondly that the supply channel is open, that it has a first side wall, a second side wall and a bed into which the at least one feeding channel discharges and moreover that the upper edges of the side walls of the supply channel end once near the sealing surface and once in a side surface of the sealing element. The side surface of the sealing element is that which, viewed in the direction of movement of the moving surface, is at the front. If for example a suction box in a suction roll is to be sealed by two seals, then the first supply channel of the first sealing element is arranged outside the suction box, viewed in the direction of movement of the perforated shell, whereas the second supply channel in the second sealing element faces the inside of the suction box. By specifying where the edges of the side walls of the supply channel end, an arrangement of a supply channel results whose cross section is approximately J-shaped or respectively parabolic with a cut off branch.

It is further feasible for the edge of the second side wall which ends in the side surface to be located at a distance of approximately 2 to 6 millimeters (mm) from the moving surface. In tests this distance has been proven to be ideal when the air boundary layer which is carried along with the moving surface, after crossing over the edge sucks the lubricant from the bed of the supply channel, up the first side wall and into the contact region between the sealing element of moving surface. For this purpose the first side wall, for example, basically assumes an angle of approximately 20 to 70° to a tangent at the sealing surface. The term "basically" indicates that the side wall may also be curved.

To provide a consistent resupply of lubricant which is easily made available, the sealing element may be equipped with a manifold for several feeding channels with at least one lubricant connection. The manifold can be incorporated into the sealing element without problems and the ends can possibly be sealed off by a plug.

In order to be able to supply the individual feeding channels with the same lubricant pressure, or lubricant temperature from the lubricant connection, the manifold may have an at least partially conical shape. The necessary conicity can be determined mathematically.

The lubricant may consist substantially of water. The term "substantially" in this case refers to the possibility that the water is supplied with lubricant additives. Otherwise water represents the most cost effective but nonetheless very efficient lubricant. Also, no conflicts occur in a suction roll due to mixtures, since the sucked-off substance is also water.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, wherein:

The FIGURE is a schematic illustration of an exemplary embodiment of the inventive sealing device.

The exemplification set out herein illustrates one embodiment of the invention and such exemplification is not to be construed as limiting the scope of the invention in any manner.

DETAILED DESCRIPTION OF THE INVENTION

Referring now to the drawing, there is shown two sealing elements 10 of a sealing device 1 in different sectional planes which can for example be arranged inside a suction roll of a paper machine and which can interact with the inside wall 3 of roll shell 2. Through such sealing elements 10 a desired number of underpressure zones 6 having different pressure levels can be sealed. Roll shell 2 is equipped with suction holes 5 for the purpose of, for example, being able to suck off moisture from a web.

In the current example each sealing element interacts with a moving surface 3, formed by shell 2 of a suction roll equipped with suction holes 5 and which is consistent with the interior shell surface. The direction of movement of interior shell surface 3 is defined by arrow 4.

Sealing element 10 is supported in a mounting 7. These mountings are known and can include a power source which is not illustrated and which presses sealing element 10 with a defined pressure against shell 2.

The surface adjoining shell 2 is sealing surface 17. It has been shown that the optimum dimension of sealing surface 17 in the direction of movement 4 of moving surface 3 is in the range of approximately 10 to 120 millimeters (mm) in order to achieve effective sealing with regard to the suction or blow zone 6. Moreover, the surface of sealing element 10 which is positioned approximately vertical to direction of movement 4 and which is the first to be crossed by a point of interior shell surface 3 is defined as side surface 16.

Through at least one lubricant connection 15, a manifold 13 which is incorporated in sealing element 10 is supplied with lubricant which generally consists substantially of water. It is however not obligatory to use water as a lubricant. Other lubricants can by all means be used, or water with lubricant additives. Manifold 13 is potentially sealed by a closure 14 and is conical in shape, in order to apply the lubricant in uniform volume and at uniform pressure to feeding channels 11. Depending on the size of the roll between approximately 1 to 50, for example 20 to 40 feeding channels 11 may be necessary. These feeding channels 11 terminate in a supply channel 12 which must be supplied constantly and uniformly over its entire length which extends generally over the entire suction zone 6, transversely to direction of movement 4.

Supply channel 12 is formed by removal of a "corner" of sealing element 10 and incorporation of an indentation. In direction of movement 4, the corner facing shell 2 is reached first by a point of the interior surface of shell 3. Supply channel 12 is open and has a first side wall 18 and a second side wall 19. These rise from bed 20 which is supplied by at least one feeding channel 11 with lubricant.

Edge 21 of first side wall 18 is thereby located near or respectively adjoining sealing surface 17, whereas edge 22 of second side wall 19 is located in side surface 16 at a distance 24 (indicated by double arrow) from the inside surface of roll shell 3 at a height of approximately 2 to 6 mm.

The boundary air layer which is carried along with interior shell surface 3 is able to draw in lubricant from bed 20 of supply channel 12 during operation along the second sidewall 19 which is arranged at between approximately 20 to 70° and to direct it to the region between sealing surface 17 and interior shell surface 3. This provides for special protection against wear on sealing element 10 and also for its cooling.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST 1 sealing device
2 shell
3 moving surface, interior shell surface
4 Direction of movement, arrow
5 suction hole
6 underpressure zone
7 mounting
10 sealing element
11 feeding channel
12 supply channel
13 manifold
14 closure
15 lubricant connection
16 side surface
17 sealing surface
18 first side wall
19 second side wall
20 bed
21 edge of first side wall
22 edge of second side wall
23 angle
24 distance

What is claimed is:
1. A machine for processing a fibrous web material, the machine comprising a sealing device sealing a suction box adjoining the interior of a moving surface in a direction of movement of the machine, the sealing device comprising:

a first sealing element and a second sealing element one on each side of the suction box and located opposite the moving surface, each said first sealing element and said second sealing element being a single monolithic element and including:

a side surface;

a sealing surface extending approximately horizontally in the direction of movement such that said sealing surface faces said moving surface;

a supply channel in the form of a cutout facing the direction of movement, said supply channel being a first cutout portion in the sealing surface and a second cutout portion in the side surface, said supply channel having a first inclined wall and a second inclined wall such that said first and second inclined walls come together at a bed radially inside of said first and second inclined walls, which when said supply channel is viewed in said direction of movement it is arranged at a beginning of each of said first sealing element and said second sealing element and opens outwardly; and at least one feed channel for a lubricant, said at least one feed channel terminating in the supply channel, wherein said supply channel of the first sealing element faces outside the suction box and said supply channel of the second sealing element faces inside the suction box.

2. The machine according to claim 1, wherein the machine is one of a paper machine, a tissue machine and a cardboard machine.

3. The machine according to claim 1, wherein said feed channel of each of said first sealing element and said second sealing element respectively terminates in said bed of said supply channel of each of said first sealing element and said second sealing element.

4. The machine according to claim 1, wherein a top edge of said first inclined wall is located near said sealing surface.

5. The machine according to claim 4, wherein said first inclined wall assumes an angle of between approximately 20° and 70° to a tangent at said sealing surface.

6. The machine according to claim 1, wherein a top edge of said second inclined wall is located at said side surface at a distance from said moving surface.

7. The machine according to claim 6, wherein said distance from said moving surface is approximately 2 to 6 millimeters (mm).

8. The machine according to claim 1, wherein the lubricant consists substantially of water.

9. The machine according to claim 1, wherein said first inclined wall extends outwardly in said direction of movement and terminates adjacent to said sealing surface.

* * * * *